(12) United States Patent
Yang

(10) Patent No.: US 11,233,878 B2
(45) Date of Patent: Jan. 25, 2022

(54) DATA PROCESSING METHOD, APPARATUS, AND CLIENT DEVICE

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/086,155

(22) Filed: Oct. 30, 2020

(65) Prior Publication Data

US 2021/0051215 A1 Feb. 18, 2021

Related U.S. Application Data

(63) Continuation of application No. PCT/CN2019/086841, filed on May 14, 2019.

(30) Foreign Application Priority Data

Aug. 1, 2018 (CN) .......................... 201810861740.2

(51) Int. Cl.
*H04L 29/08* (2006.01)
*H04L 29/06* (2006.01)
(Continued)

(52) U.S. Cl.
CPC ............ *H04L 67/42* (2013.01); *G06F 9/5027* (2013.01); *H04L 9/0637* (2013.01);
(Continued)

(58) Field of Classification Search
CPC ...................................................... H04L 67/42
See application file for complete search history.

(56) References Cited

U.S. PATENT DOCUMENTS 6,681,251 B1 * 1/2004 Leymann ............ H04L 67/1008
709/203
7,693,991 B2 4/2010 Greenlee et al.
(Continued)

FOREIGN PATENT DOCUMENTS

CN 101431520 5/2009
CN 102761528 10/2012
(Continued)

OTHER PUBLICATIONS

Blog.csdn.net [online], "Mpp distributed solution based on Postgres-XL," Nov. 16, 2016, retrieved on Nov. 12, 2020, retrieved from URL<https://blog.csdn.net/sunziyue/article/details/53189304>, 24 pages (with English machine translation).
(Continued)

*Primary Examiner* — Adnan M Mirza
(74) *Attorney, Agent, or Firm* — Fish & Richardson P.C.

(57) ABSTRACT

A data processing computer-implemented method, medium, and system are disclosed. In one computer-implemented method, a target coordination server is selected from multiple coordination servers based on performance information of server clusters, where the multiple coordination servers respectively belong to multiple server clusters. A data processing request is sent to the target coordination server, so that a server cluster that the target coordination server belongs to can prioritize handling of the data processing request.

24 Claims, 9 Drawing Sheets

(51) Int. Cl.
*G06F 9/50* (2006.01)
*H04L 9/06* (2006.01)

(52) U.S. Cl.
CPC ...... *H04L 67/1029* (2013.01); *H04L 67/1097* (2013.01); *H04L 67/2895* (2013.01); *H04L 67/34* (2013.01); *H04L 2209/38* (2013.01)

(56) References Cited

U.S. PATENT DOCUMENTS

| | | | |
|---|---|---|---|
| 10,015,243 | B2* | 7/2018 | Kazerani ............... H04L 67/101 |
| 2009/0049443 | A1 | 2/2009 | Powers et al. |
| 2016/0321654 | A1 | 11/2016 | Lesavich et al. |
| 2016/0342644 | A1 | 11/2016 | Stolarz et al. |
| 2017/0083368 | A1 | 3/2017 | Bishop et al. |
| 2017/0279774 | A1* | 9/2017 | Booz ..................... G06Q 20/123 |
| 2018/0060395 | A1 | 3/2018 | Pathak et al. |
| 2018/0157825 | A1 | 6/2018 | Eksten et al. |
| 2018/0189100 | A1 | 7/2018 | Nemoto et al. |

FOREIGN PATENT DOCUMENTS

| | | |
|---|---|---|
| CN | 104780210 | 7/2015 |
| CN | 104834722 | 8/2015 |
| CN | 105719185 | 6/2016 |
| CN | 105959395 | 9/2016 |
| CN | 106339255 | 1/2017 |
| CN | 106487936 | 3/2017 |
| CN | 106598490 | 4/2017 |
| CN | 106713412 | 5/2017 |
| CN | 106817408 | 6/2017 |
| CN | 106991164 | 7/2017 |
| CN | 107040582 | 8/2017 |
| CN | 107079059 | 8/2017 |
| CN | 107317730 | 11/2017 |
| CN | 107317841 | 11/2017 |
| CN | 107360206 | 11/2017 |
| CN | 107436813 | 12/2017 |
| CN | 107645519 | 1/2018 |
| CN | 106959826 | 7/2018 |
| CN | 108345643 | 7/2018 |
| CN | 109032803 | 12/2018 |
| WO | WO 2018049713 | 3/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/086841, dated Aug. 19, 2019, 9 pages (with partial English translation).
Shao et al., "Blockchain: Architecture and Research Progress," Chinese Journal of Computers, May 2018, pp. 1-21 (with English abstract).
Xie, "Detailed explanation of Hadoop Application Development-In-Depth Cloud Computing," China Railway Publishing House, Jun. 2013, 366-370 (with English machine translation).
Yu, "Research to Technology to Improve Mobile Streaming Media Performance from Cloud to Terminal," Electronic Science and Technology University Press, Sep. 2015, pp. 200-204 (with English machine translation).
EP Extended Search Report in European Application No. 19845116. 3, dated Apr. 30, 2021, 8 pages.
MCMS2002 Content Management technology, 1st ed., Chen (ed)., Mar. 2004, pp. 177-183, 17 pages (with machine translation).
PCT International Preliminary Report on Patentability in International Application No. PCT/CN2019/086841, dated Feb. 2, 2021, 11 pages (with English translation).

* cited by examiner

DATA PROCESSING METHOD, APPARATUS, AND CLIENT DEVICE

CROSS-REFERENCE TO RELATED APPLICATIONS

This application is a continuation of PCT Application No. PCT/CN2019/086841, filed on May 14, 2019, which claims priority to Chinese Patent Application No. 201810861740.2, filed on Aug. 1, 2018, and each application is hereby incorporated by reference in its entirety.

TECHNICAL FIELD

Implementations of the present specification relate to the field of computer technologies, and in particular, to data processing methods, apparatuses, and client devices.

BACKGROUND

With the rapid development of the Internet, various types of data emerge and grow explosively. The blockchain technology has become a focus and a research direction in many technical fields due to features such as decentralization, tamper-resistance, and distribution.

In the related technology, a data processing system can include a service server and a blockchain server. The blockchain server can join the blockchain network as a blockchain node. In actual services, the service server needs to frequently perform read/write operations on the blockchain server, for example, read data blocks from the blockchain server or write account status data into the blockchain server. In the related technology, the frequent read/write operations performed by the service server on the blockchain server cause relatively large access pressure on the blockchain server, and lower the data processing speed of the data processing system.

SUMMARY

An objective of implementations of the present specification is to provide data processing methods, apparatuses, and client devices, so as to increase a data processing speed.

To implement the previous objective, implementations of the present specification provide a data processing method, including: selecting a target coordination server from multiple coordination servers based on performance information of server clusters, where the multiple coordination servers respectively belong to multiple server clusters; and sending a data processing request to the target coordination server, so a server cluster that the target coordination server belongs to can prioritize handling of the data processing request.

To implement the previous objective, implementations of the present specification provide a data processing apparatus, including: a selection unit, configured to select a target coordination server from multiple coordination servers based on performance information of server clusters, where the multiple coordination servers respectively belong to multiple server clusters; and a sending unit, configured to send a data processing request to the target coordination server, so a server cluster that the target coordination server belongs to can prioritize handling of the data processing request.

To implement the previous objective, implementations of the present specification provide a client device, including a memory, configured to store computer instructions; and a processor, configured to execute the computer instructions to implement the following steps: selecting a target coordination server from multiple coordination servers based on performance information of server clusters, where the multiple coordination servers respectively belong to multiple server clusters; and sending a data processing request to the target coordination server, so a server cluster that the target coordination server belongs to can prioritize handling of the data processing request.

It can be understood from the technical solutions of the previous implementations of the present specification that, in the implementations of the present specification, the client device can select a target coordination server from multiple coordination servers based on performance information of server clusters, and send a data processing request to the target coordination server, so a server cluster that the target coordination server belongs to can prioritize handling of the data processing request. As such, the client device can send the data processing request to different coordination servers based on different performance information of the server clusters, thereby achieving load balancing of multiple server clusters and accelerating data processing.

BRIEF DESCRIPTION OF DRAWINGS

To describe technical solutions in implementations of the present specification or in the existing technology more clearly, the following briefly describes the accompanying drawings needed for describing the implementations or the existing technology. Clearly, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Figure 1:
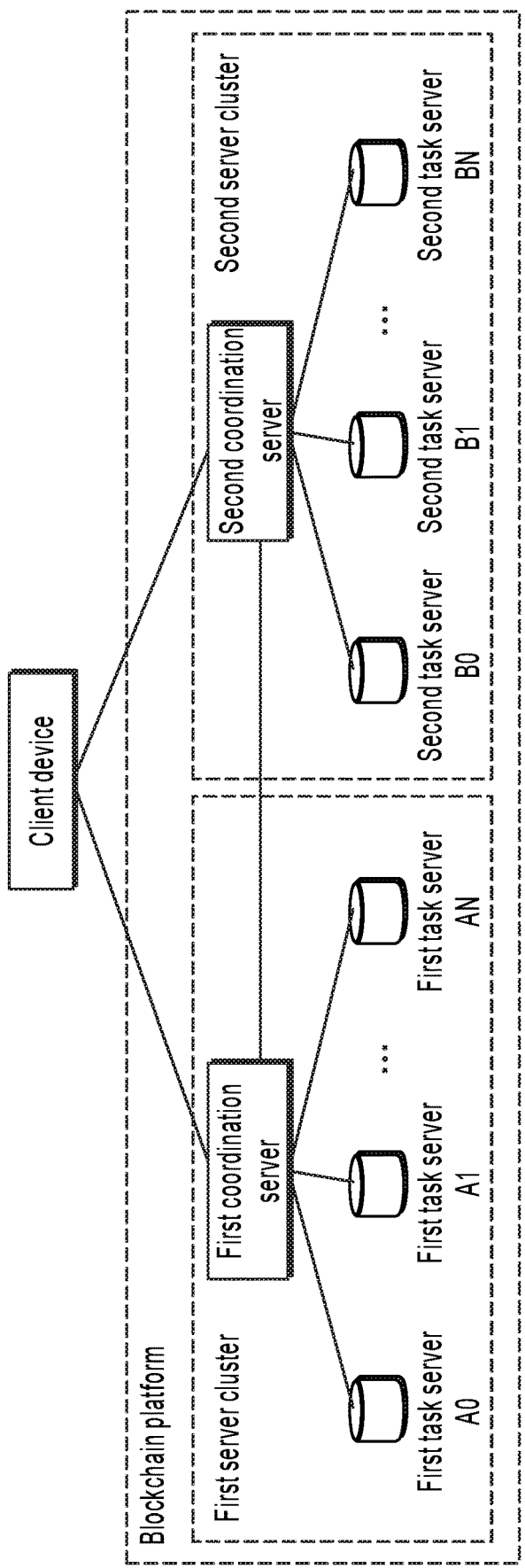
FIG. 1 is a schematic structural diagram illustrating a data processing system; according to an implementation of the present specification.

The following clearly and comprehensively describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification.

To help a person skilled in the art to understand the technical solutions in the implementations of the present specification, the following first describes the technical terms in the implementations of the present specification.

Blockchain is a distributed ledger that organizes multiple pieces of block data in a chain structure based on a time sequence, and ensures security, traceability, and non-tampering by using a cryptography algorithm. The blockchain can include a public blockchain, a consortium blockchain, a private blockchain, etc.

A blockchain can be established between a plurality of individuals, groups, or institutions based on the blockchain technology, and the plurality of individuals, groups or institutions can join the blockchain and become members thereof. Transaction data between members can be stored in block data in the blockchain. Each piece of block data can record at least one piece of transaction data generated by a member in the blockchain in a specific time interval, which can specifically include a block header, a block body, etc.

The blockchain can correspond to multiple pieces of status data. Each piece of status data can correspond to a member identifier. The status data can be used to describe the status of the member identifier. For example, the member identifier can include a member account, and the status data can include an asset balance of the member account. Certainly, the member account and the asset balance here are merely examples, and actually, the member identifier and the status data can also be other data.

The blockchain can include multiple pieces of block data. Each piece of block data in the blockchain can have a location value. Location values of different block data are different. The location value can be used to indicate the location of block data in the blockchain. The block data can be obtained from the blockchain based on the location value. In addition, the location value can further be associated with the creation moment of the block data. Specifically, the location value of the block data whose creation time is earlier is smaller. The location value of the block data whose creation time is later is larger. The location value can include a block height. Certainly, the location value can further include any other data that can be used to identify the location of the block data.

The blockchain can be implemented based on a blockchain network. The blockchain network can include a peer-to-peer network (P2P network) etc. The blockchain network can include a plurality of blockchain nodes. Each blockchain node can store all or a part of the block data in the blockchain. Each blockchain node can be one server, or can be a distributed server cluster including multiple servers.

The distributed server cluster can include a coordination server and multiple task servers. The coordination server can be responsible for task allocation and management. The task server can be responsible for task processing. The distributed server cluster can provide external services as a whole. The distributed server cluster can be specifically implemented based on the massively parallel processing (MPP) architecture technology. Certainly, the distributed server cluster can be further implemented based on another architecture technology. This is not specifically limited in this implementation of the present specification.

Referring to FIG. 1, an implementation of the present specification provides a data processing system.

In this implementation, the data processing system can include a blockchain platform. The blockchain platform can serve as a blockchain node in a blockchain network. The blockchain platform can include at least two server clusters. The at least two server clusters can include a first server cluster and a second server cluster. The first server cluster can include a first coordination server and multiple first task servers. The second server cluster can include a second coordination server and multiple second task servers. Compared with the first task server, the second task server can have better hardware configuration and/or software configuration. Therefore, the second server cluster can have a higher data processing capability than the first server cluster.

In this implementation, the first server cluster and the second server cluster can separately store at least one piece of block data in the blockchain. The block data in the first server cluster and the second server cluster can be considered as block data stored in the blockchain platform. In addition, as described above, the blockchain platform can serve as a blockchain node in the blockchain network. As such, the block data in the first server cluster and the second server cluster can be considered as block data stored in the blockchain node. Block data in the first server cluster can be different from that in the second server cluster. The total quantity of block data in the first server cluster and the second server cluster can be less than or equal to the quantity of block data in the blockchain.

The following describes the method for storing the block data in the first server cluster. For ease of description, here, a set formed by the block data in the first server cluster can be used as a block data set. In the first server cluster, block data in the block data set can be distributed and stored in each first task server based on a first specific rule. The first specific rule can be flexibly set based on actual needs. For example, the first server cluster can include N first task servers. Each first task server can have a first server identifier. The first server identifier here can be used to identify the first task server, for example, can be an IP address, a MAC address, or a number of the first task server. The first server identifiers of the N first task servers can be A0, A1, A2, . . . , A(N−1). In this case, block data with location values divisible by N in the block data set can be stored in a first task server with a first task server identifier A0. Block data with location values divisible by N with a remainder 1 in the block data set can be stored in a first task server with a first task server identifier A1. By analogy, block data with location values divisible by N with a remainder N−1 in the block data set can be stored in a first task server with a first task server identifier A(N−1). In the first server cluster, the first coordination server can store location value configuration data. The location value configuration data can include at least one location value. Each location value in the location value configuration data can correspond to a first server identifier. Block data identified by the location value can be stored in a first task server identified by the first server identifier. A storage method of block data in the second server cluster can be similar to that of the first server cluster.

It is worthwhile to note that as described above, the block data in the first server cluster and the second server cluster can be considered as block data stored in the blockchain platform. Block data usually cannot be changed after being generated. Operations on the block data typically include only read operations (e.g., reading the block data and reading transaction data in the block data). The read operation occupies fewer performance resources (such as CPU, internal memory, and external memory). To reserve a relatively large quantity of performance resources for the second server cluster to process other types of data, a large quantity of block data that has been created earlier in the blockchain platform can be stored in the first server cluster. A small quantity of block data that is created later in the blockchain platform can be stored in the second server cluster. Specifically, as described above, the second server cluster can have a higher data processing capability than the first server cluster. Therefore, newly added block data of the blockchain platform can come from the second server cluster, for example, from a second coordination server and/or a second task server in the second server cluster. The newly added block data of the blockchain platform can be first stored in the second server cluster, for example, stored in a second task server in the second server cluster based on the first specific rule. As such, the second coordination server can migrate, to the first server cluster at intervals of a first predetermined time interval, block data that satisfies a location value determining condition in each second task server. Specifically, the second coordination server can obtain, from each second task server, block data that satisfies the location value determining condition, and send the obtained block data to the first coordination server. The first coordination server can receive the block data and store the received block data into a first task server based on the first specific rule. Here, the first predetermined time interval can be flexibly set based on actual needs, for example, 5 hours, 1 day, or 2 days. The location value determining condition can be flexibly set based on actual needs. For example, the location value determining condition can include that the difference between a location value and a maximum location value is greater than or equal to a first predetermined threshold. The maximum location value can be the location value of block data with the latest creation time. The first predetermined threshold can be, for example, 1000, 1052, or 1070. For another example, the location value determining condition can further include that a location value is less than or equal to a second predetermined threshold.

In this implementation, the second server cluster can further store status data of the blockchain. Specifically, the status data of the blockchain can be changed. Operations on the status data can include a read operation and a write operation. To accelerate the processing speed for the status data, the status data of the blockchain can be stored in the second server cluster.

The following describes the method for storing the status data in the second server cluster. For ease of description, here, a set formed by various pieces of status data of the blockchain can be used as a status data set. In the second server cluster, status data in the status data set can be distributed and stored in each second task server based on a second specific rule. The second specific rule can be flexibly set based on actual needs. For example, the second server cluster can include N second task servers. Each second task server can have a second server identifier. The second server identifier here can be used to identify the second task server, for example, can be an IP address, a MAC address, or a number of the second task server. The second server identifiers of the N second task servers can be B0, B1, B2, . . . , B(N−1). In this case, status data whose member identifier is divided by N with a remainder 0 in the status data set can be stored in a second task server with a second task server identifier $130$. Status data whose member identifier is divided by N with a remainder 1 in the status data set can be stored in a second task server with a second task server identifier B1. By analogy, status data whose member identifier is divided by N with a remainder N−1 in the status data set can be stored in a second task server with a second task server identifier B(N−1). In the second server cluster, the second coordination server can store member identifier configuration data. The member identifier configuration data can include at least one member identifier. Each member identifier in the member identifier configuration data can correspond to a second server identifier; and status data corresponding to the member identifier can be stored in a second task server identified by the second server identifier.

In an example method of this implementation, the first coordination server in the first server cluster can further store first code value configuration data. The second coordination server in the second server cluster can further store second code value configuration data. Both the first code value configuration data and the second code value configuration data can include at least one code value. Each code value in the first code value configuration data and the second code value configuration data can correspond to a location value. The total quantity of location values corresponding to code values in the first code value configuration data and the second code value configuration data can be less than or equal to the quantity of block data in the blockchain platform. The code value can be a code value of block data or a code value of transaction data. The code value of the block data can be used to identify the block data, and can be specifically correspond to the location value of the block data. The code value of the transaction data can be used to identify the transaction data, and can specifically correspond to the location value of block data that includes the transaction data. The code value can include a hash value. The hash value can be calculated based on a hash algorithm. The hash algorithm can include SHA-1, SHA-224, SRA-256, SHA-512, etc. In addition, when the code values in the first code value configuration data and the second code value configuration data are code values of the transaction data, each code value in the first code value configuration data and the second code value configuration data can further correspond to an offset. The offset can be used to indicate an offset location of the transaction data corresponding to the code value in the block data, so the transaction data is quickly obtained from the block data.

It is worthwhile to note that, as described above, the newly added block data of the blockchain platform can be first stored in the second server cluster. As such, a code value corresponding to the newly added block data in the blockchain platform can be first added to the second code value configuration data. The code value corresponding to the newly added block data can be a code value of the block data or a code value of transaction data in the block data. As such, the second coordination server can migrate, to the first coordination server at intervals of a second predetermined time interval, the code value that is in the second code value configuration data and that satisfies a code value determining condition. Specifically, the second coordination server can obtain, from the second code value configuration data, a code value that satisfies the code value determining condition; and send the obtained code value to the first coordination server. The first coordination server can receive the code value and add the received code value to the first code value configuration data. Here, the second predetermined time interval can be flexibly set based on actual needs, for example, 10 hours, 5 days, or 10 days. The code value determining condition can be flexibly set based on actual needs. For example, the code value determining condition can include that the code value is less than or equal to a third predetermined threshold.

In this implementation, the data processing system can further include a client device. The client device can be a service server, a server cluster including multiple service servers, etc. The client device can select a target coordination server from multiple coordination servers based on performance information of server clusters, where the multiple coordination servers respectively belong to multiple server clusters; and send a data processing request to the target coordination server, so a server cluster that the target coordination server belongs to can prioritize handling of the data processing request.

Figure 2:
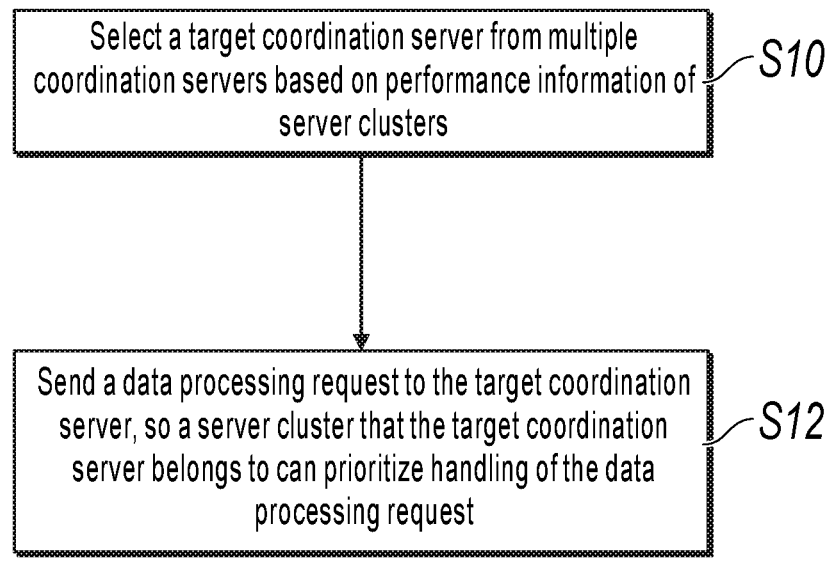
FIG. 2 is a flowchart illustrating a data processing method according to an implementation of the present specification.

Referring to FIG. 2, an implementation of the present specification provides a data processing method. The data processing method is executed by a client device and can include the following steps.

Step S10: Select a target coordination server from multiple coordination servers based on performance information of server clusters.

In this implementation, the performance information can be used to indicate a data processing capability of a server cluster. The performance information can include at least one of the following: the quantity of block data stored in a server cluster, the ratio between the quantity of block data stored in the server cluster and the quantity of block data in a blockchain, the throughput (TPS) of the server cluster, the concurrency of the server cluster, the response time of the server cluster, the hardware configuration of the server cluster, and the software configuration of the server cluster. The hardware configuration can include, for example, a CPU, an internal memory, and an external memory. The software configuration can include, for example, a software version. Specifically, a larger quantity of block data stored in a server cluster indicates a lower data processing capability of the server cluster. The greater the ratio between the quantity of block data stored in a server cluster and the quantity of block data in the blockchain is, the lower the data processing capability of the server cluster. A larger throughput of a server cluster indicates a lower data processing capability of the server cluster. A higher concurrency of a server cluster indicates a lower data processing capability of the server cluster. A longer response time of a server cluster indicates a lower data processing capability of the server cluster. A higher hardware configuration of a server cluster indicates a higher data processing capability of the server cluster.

In this implementation, the multiple coordination servers can include a first coordination server and a second coordination server. For descriptions of the first coordination server and the second coordination server, reference can be made to the previous implementations. The client device can compare a data processing capability of the first server cluster with that of the second server cluster based on the performance information of the first server cluster and that of the second server cluster. When the data processing capability of the first server cluster is higher than that of the second server cluster, the first coordination server can be selected as the target coordination server. When the data processing capability of the first server cluster is lower than that of the second server cluster, the second coordination server is selected as the target coordination server.

It is worthwhile to note that the client device can obtain the performance information of the first server cluster and the second server cluster at a predetermined time interval. Specifically, the client device can separately send a performance information obtaining request to the first coordination server and the second coordination server at the predetermined time interval. The first coordination server can receive the performance information obtaining request, obtain the performance information of the server cluster that the first coordination server is located, and send the obtained performance information to the client device. The second coordination server can receive the performance information obtaining request, obtain the performance information of the server cluster that the second coordination server is located, and send the obtained performance information to the client device. The client device can separately receive the performance information sent by the first coordination server and the second coordination server. Or the first coordination server can proactively send, to the client device at the predetermined time interval, the performance information of the server cluster that the first coordination server is located. The client device can receive the performance information sent by the first coordination server. Similarly, the second coordination server can proactively send, to the client device at the predetermined time interval, the performance information of the server cluster that the second coordination server is located. The client device can receive the performance information sent by the second coordination server.

Step S12: Send a data processing request to the target coordination server, so a server cluster that the target coordination server belongs to can prioritize handling of the data processing request.

In this implementation, the data processing request can include at least one of the following: a block data reading request, a status data reading request, a status data writing request, and a transaction data reading request. The block data reading request can include a location value of to-be-read block data or a code value of to-be-read block data. The status data reading request can include a member identifier. The status data writing request can include a member identifier and the to-be-processed data. The transaction data reading request can include a code value of to-be-read transaction data.

In this implementation, the data processing request can identify the to-be-processed data. Specifically, when the data processing request is a block data reading request, the to-be-processed data can be understood as to-be-read block data. When the data processing request is a status data reading request, the to-be-processed data can be understood as to-be-read status data. When the data processing request is a status data writing request, the to-be-processed data can be understood as to-be-written status data. When the data processing request is a transaction data reading request, the to-be-processed data can be understood as to-be-read transaction data.

In this implementation, that the server cluster that the target coordination server belongs to prioritizes handling of the data processing request can be understood as follows: When the server cluster that the target coordination server belongs to can independently process the data processing request, the server cluster that the target coordination server belongs to independently processes the data processing request; and when the server cluster that the target coordination server belongs to cannot independently process the data processing request, the target coordination server can communicate with another coordination server, so the server cluster that the target coordination server belongs to and a server cluster that the another coordination server belongs to jointly process the data processing request.

The following describes specific implementation of this implementation in detail by using several implementations.

Figure 3:
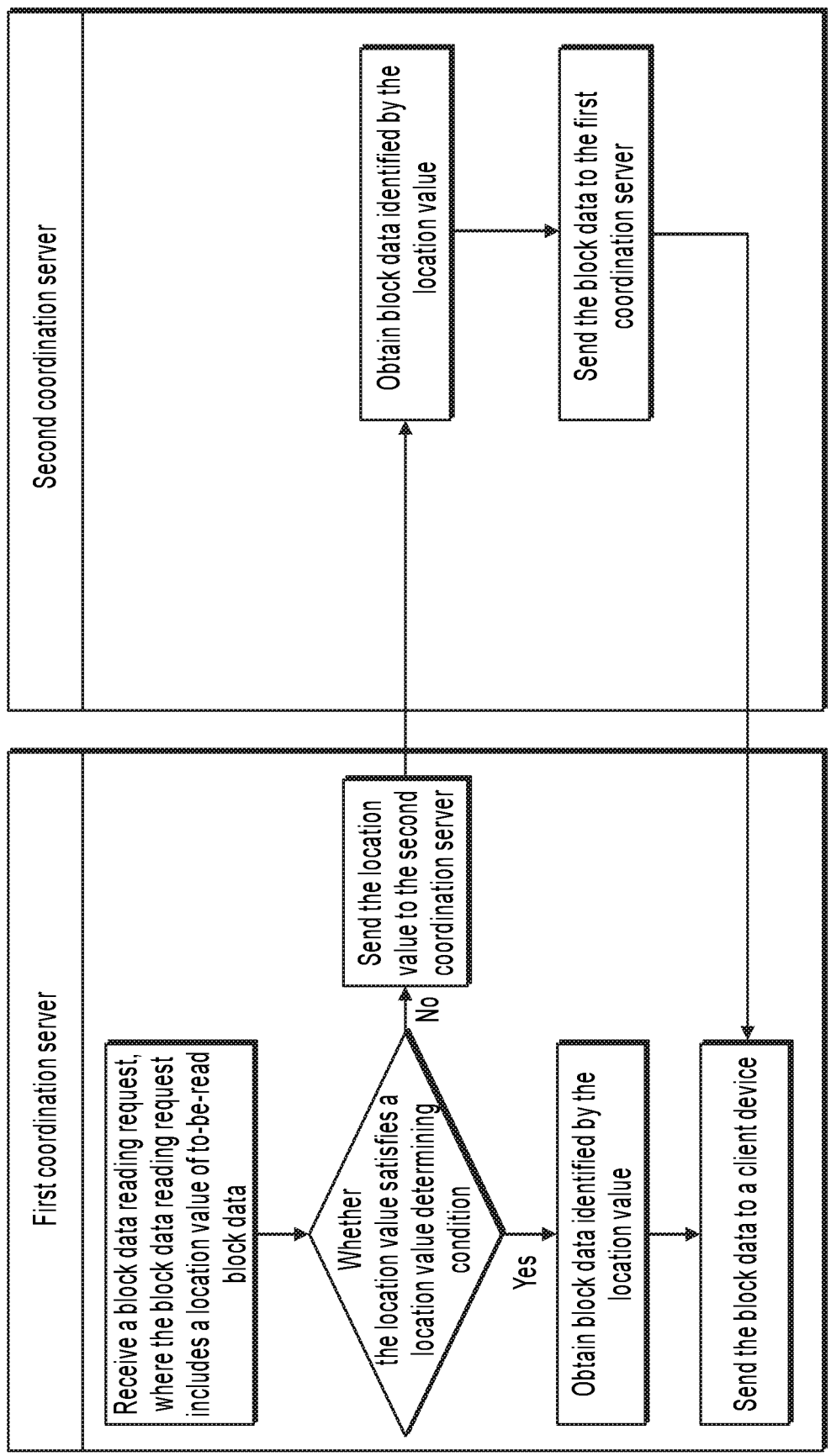
FIG. 3 is a flowchart illustrating a block data reading method according to an implementation of the present specification.

Referring to FIG. 3, in an example method of this implementation, the to-be-processed data can be to-be-read block data. The client device can select a first coordination server as a target coordination server, and send a block data reading request to the first coordination server. The block data reading request can include a location value of the to-be-read block data. The first coordination server can receive the block data reading request, and determine whether the location value satisfies a location value determining condition.

When the location value satisfies the location value determining condition, the first coordination server considers that block data identified by the location value is stored in the server cluster that the first coordination server is located; obtain the block data identified by the location value; and send the obtained block data to the client device. The client device can receive the block data. Specifically, the first coordination server can obtain a first server identifier corresponding to the location value based on location value configuration data, and send the location value to a first task server identified by the obtained first server identifier. The first task server identified by the obtained first server identifier can receive the location value, locally obtain block data identified by the location value, and send the block data to the first coordination server. The first coordination server can receive the block data. For the description of the location value configuration data, refer to the previous implementation.

When the location value does not satisfy the location value determining condition, the first coordination server considers that the block data identified by the location value is stored in a second server cluster, and can send the location value to the second coordination server. The second coordination server can receive the location value, obtain the block data identified by the location value, and send the block data to the first coordination server. The first coordination server can receive the block data and send the block data to the client device. The client device can receive the block data. The process that the second coordination server obtains the block data identified by the location value can be similar to the process that the first coordination server obtains the block data identified by the location value. Mutual references can be made.

Figure 4:
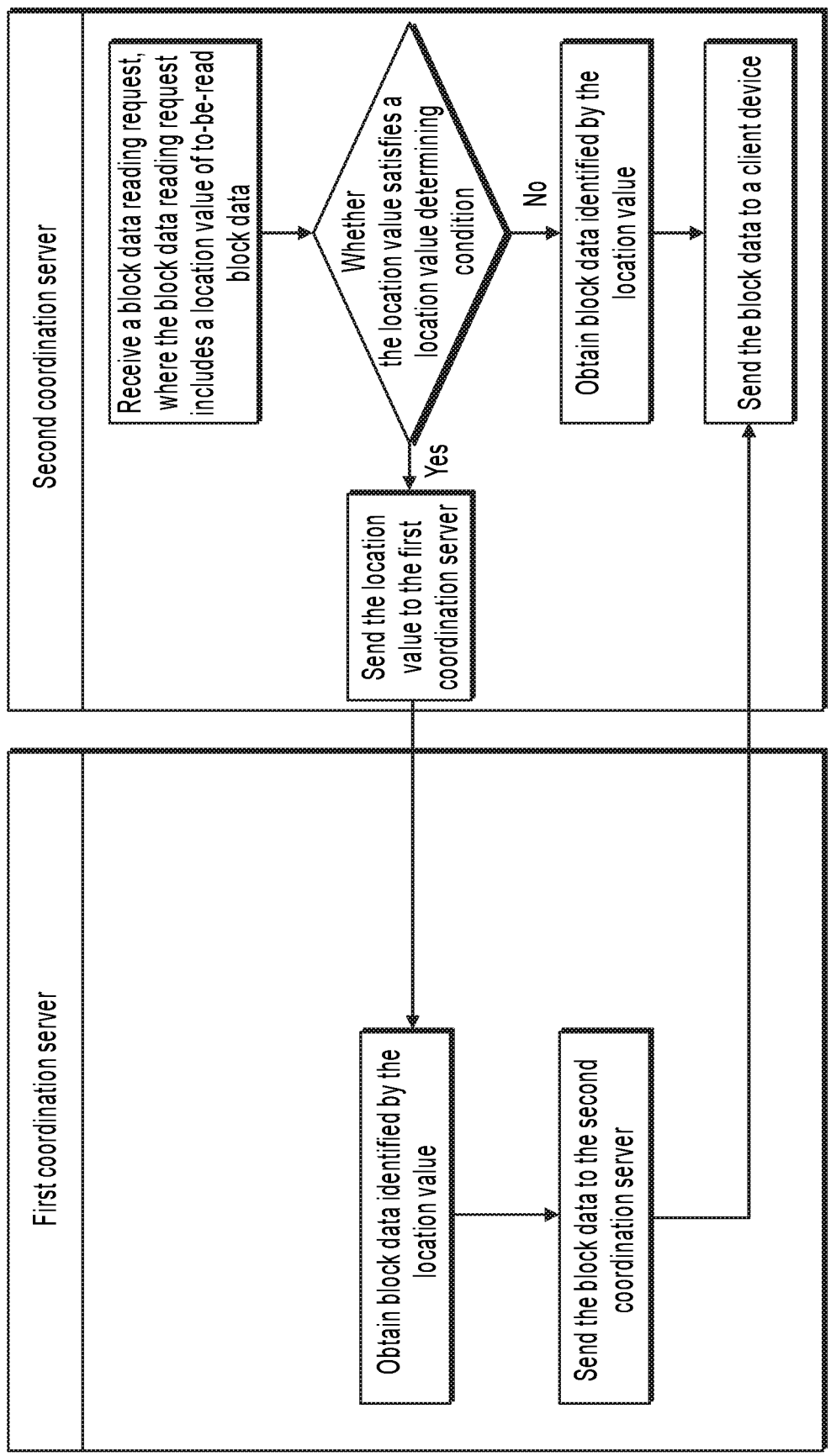
FIG. 4 is a flowchart illustrating a block data reading method according to an implementation of the present specification.

Referring to FIG. 4, in another example method of this implementation, the to-be-processed data can be to-be-read block data. The client device can select a second coordination server as a target coordination server, and send a block data reading request to the second coordination server. The block data reading request can include a location value of the to-be-read block data. The second coordination server can receive the block data reading request, and determine whether the location value satisfies a location value determining condition.

When the location value satisfies the location value determining condition, the second coordination server considers that the block data identified by the location value is stored in a first server cluster, and can send the location value to the first coordination server. The first coordination server can receive the location value, obtain the block data identified by the location value, and send the block data to the second coordination server. The second coordination server can receive the block data and send the block data to the client device. The client device can receive the block data.

When the location value does not satisfy the location value determining condition, the second coordination server considers that block data identified by the location value is stored in the server cluster that the second coordination server is located; obtain the block data identified by the location value; and send the block data to the client device. The client device can receive the block data.

In an example method of this implementation, the to-be-processed data can be to-be-read status data. The client device can select a second coordination server as a target coordination server, and send a status data reading request to the second coordination server. The status data reading request can include a member identifier. The second coordination server can receive the status data reading request, obtain a second server identifier corresponding to the member identifier based on member identifier configuration data, and send the member identifier to a second task server identified by the obtained second server identifier. The second task server identified by the obtained second server identifier can receive the member identifier, locally obtain status data corresponding to the member identifier, and send the status data to the second coordination server. The second coordination server can receive the status data and send the status data to the client device. The client device can receive the status data. For the description of the member identifier configuration data, refer to the previous implementation.

In another example method of this implementation, the to-be-processed data can be to-be-read status data. The client device can select a first coordination server as a target coordination server, and send a status data reading request to the first coordination server. The status data reading request can include a member identifier. The first coordination server can receive the status data reading request and send the member identifier to the second coordination server. The second coordination server can receive the member identifier, obtain status data corresponding to the member identifier, and send the status data to the first coordination server. The first coordination server can receive the status data and send the status data to the client device. The client device can receive the status data. For the process that the second coordination server obtains the status data corresponding to the member identifier, refer to the previous example method.

In an example method of this implementation, the to-be-processed data can be to-be-written status data. The client device can select a second coordination server as a target coordination server, and send a status data writing request to the second coordination server. The status data writing request can include a member identifier and to-be-written status data. The second coordination server can receive the status data writing request, obtain a second server identifier corresponding to the member identifier based on member identifier configuration data, and send the member identifier and the to-be-written status data to a second task server identified by the obtained second server identifier. The second task server identified by the obtained second server identifier can receive the member identifier and the to-be-written status data, store the to-be-written status data as status data corresponding to the member identifier, and send response information to the second coordination server. The second coordination server can receive the response information and send the response information to the client device. The client device can receive the response information.

In another example method of this implementation, the to-be-processed data can be to-be-written status data. The client device can select a first coordination server as a target coordination server, and send a status data writing request to the first coordination server. The status data writing request can include a member identifier and to-be-written status data. The first coordination server can receive the status data writing request and send the member identifier and the to-be-written status data to the second coordination server. The second coordination server can receive the member identifier and to-be-written status data, perform a write operation based on the member identifier and the to-be-written status data, and send response information to the first coordination server. The first coordination server can receive the response information and send the response information to the client device. The client device can receive the response information. For the process that the second coordination server performs a write operation based on the member identifier and the to-be-written status data, refer to the previous example method.

Figure 5:
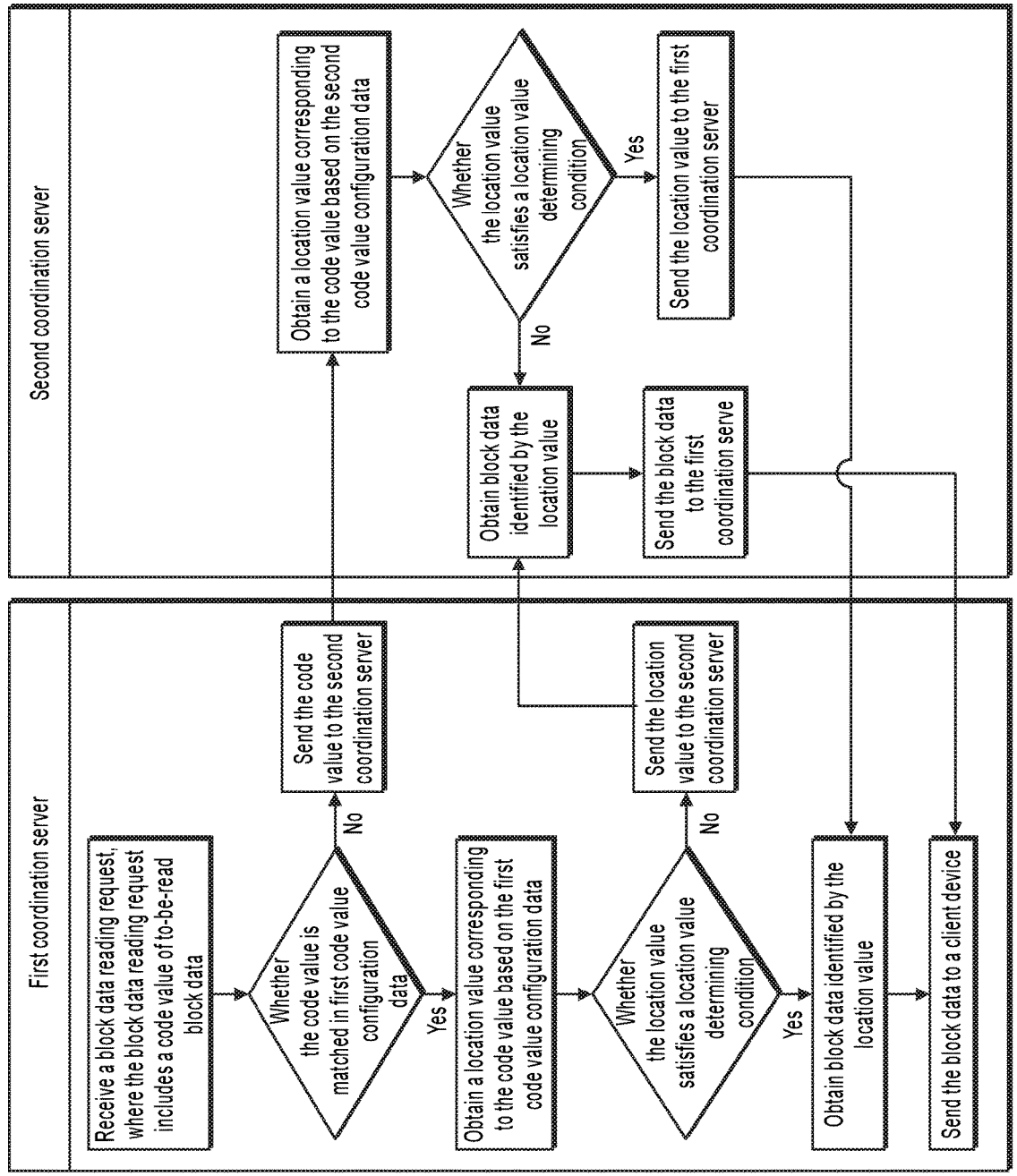
FIG. 5 is a flowchart illustrating a block data reading method according to an implementation of the present specification.

Referring to FIG. 5, in an example method of this implementation, the to-be-processed data can be to-be-read block data. The client device can select a first coordination server as a target coordination server, and send a block data reading request to the first coordination server. The block data reading request can include a code value of the to-be-read block data. The first coordination server can receive the block data reading request and perform matching on the code value in first code value configuration data.

When the code value is matched in the first code value configuration data, the first coordination server can obtain a location value corresponding to the code value based on the first code value configuration data; and can determine whether the location value satisfies a location value determining condition. When the location value satisfies the location value determining condition, the first coordination server considers that block data identified by the location value is stored in the server cluster that the first coordination server is located; obtain the block data identified by the location value; and send the block data to the client device. The client device can receive the block data. When the location value does not satisfy the location value determining condition, the first coordination server considers that the block data identified by the location value is stored in a second server cluster, and can send the location value to the second coordination server. The second coordination server can receive the location value, obtain the block data identified by the location value, and send the block data to the first coordination server. The first coordination server can receive the block data and send the block data to the client device. The client device can receive the block data. For the process that the first coordination server and the second coordination server obtain the block data identified by the location value, refer to the previous example method. That the code value is matched in the first code value configuration data can be understood as: finding the code value in the first code value configuration data.

When the code value is not matched in the first code value configuration data, the first coordination server considers that the code value can be matched in second code value configuration data; and can send the code value to the second coordination server. The second coordination server can receive the code value, obtain the location value corresponding to the code value based on the second code value configuration data, and determine whether the location value satisfies the location value determining condition. When the location value does not satisfy the location value determining condition, the second coordination server considers that block data identified by the location value is stored in the server cluster that the second coordination server is located; obtain the block data identified by the location value; and send the block data to the first coordination server. The first coordination server can receive the block data and send the block data to the client device. The client device can receive the block data. When the location value satisfies the location value determining condition, the second coordination server considers that the block data identified by the location value is stored in a first server cluster, and can send the location value to the first coordination server. The first coordination server can receive the location value, obtain the block data identified by the location value, and send the block data to the client device. The client device can receive the block data. That the code value is not matched in the first code value configuration data can be understood as: failing to find the code value in the first code value configuration data.

Figure 6:
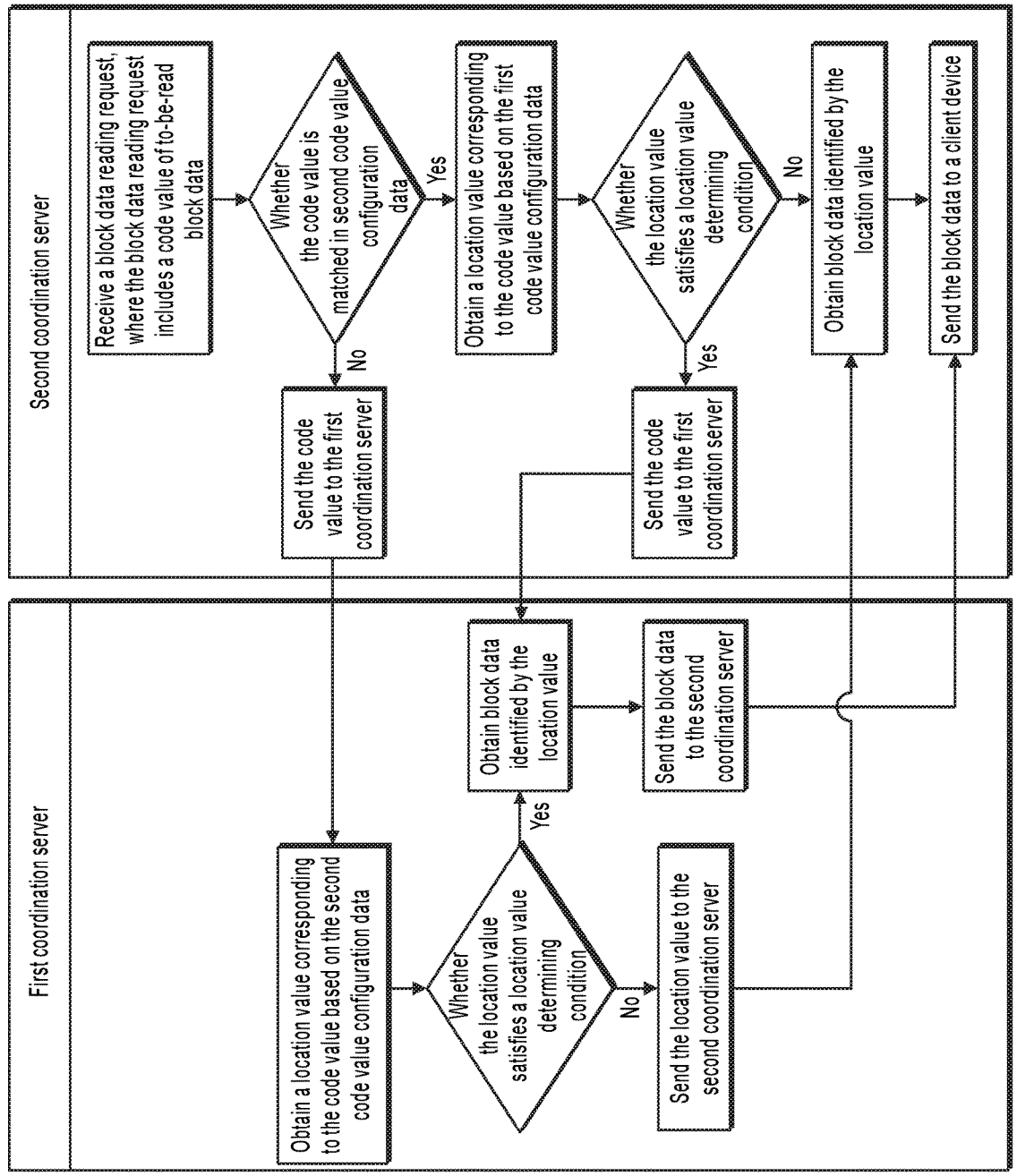
FIG. 6 is a flowchart illustrating a block data reading method according to an implementation of the present specification.

Referring to FIG. 6, in another example method of this implementation, the to-be-processed data can be to-be-read block data. The client device can select a second coordination server as a target coordination server; and send a block data reading request to the second coordination server. The block data reading request can include a code value of the to-be-read block data. The second coordination server can receive the block data reading request and perform matching on the code value in second code value configuration data.

When the code value is matched in the second code value configuration data, the second coordination server can obtain a location value corresponding to the code value based on the second code value configuration data; and can determine whether the location value satisfies a location value determining condition. When the location value satisfies the location value determining condition, the second coordination server considers that the block data identified by the location value is stored in a first server cluster, and can send the location value to the first coordination server. The first coordination server can receive the location value, obtain the block data identified by the location value, and send the block data to the second coordination server. The second coordination server can receive the block data and send the block data to the client device. The client device can receive the block data. When the location value does not satisfy the location value determining condition, the second coordination server considers that block data identified by the location value is stored in the server cluster that the second coordination server is located; obtain the block data identified by the location value; and send the block data to the client device. The client device can receive the block data.

When the code value is not matched in the second code value configuration data, the second coordination server considers that the code value can be matched in first code value configuration data; and can send the code value to the first coordination server. The first coordination server can receive the code value, obtain the location value corresponding to the code value based on the first code value configuration data, and determine whether the location value satisfies the location value determining condition. When the location value satisfies the location value determining condition, the first coordination server considers that block data identified by the location value is stored in the server cluster that the first coordination server is located; obtain the block data identified by the location value; and send the block data to the second coordination server. The second coordination server can receive the block data and send the block data to the client device. The client device can receive the block data. When the location value does not satisfy the location value determining condition, the first coordination server considers that the block data identified by the location value is stored in a second server cluster, and can send the location value to the second coordination server. The second coordination server can receive the location value, obtain the block data identified by the location value, and send the block data to the client device. The client device can receive the block data.

Figure 7:
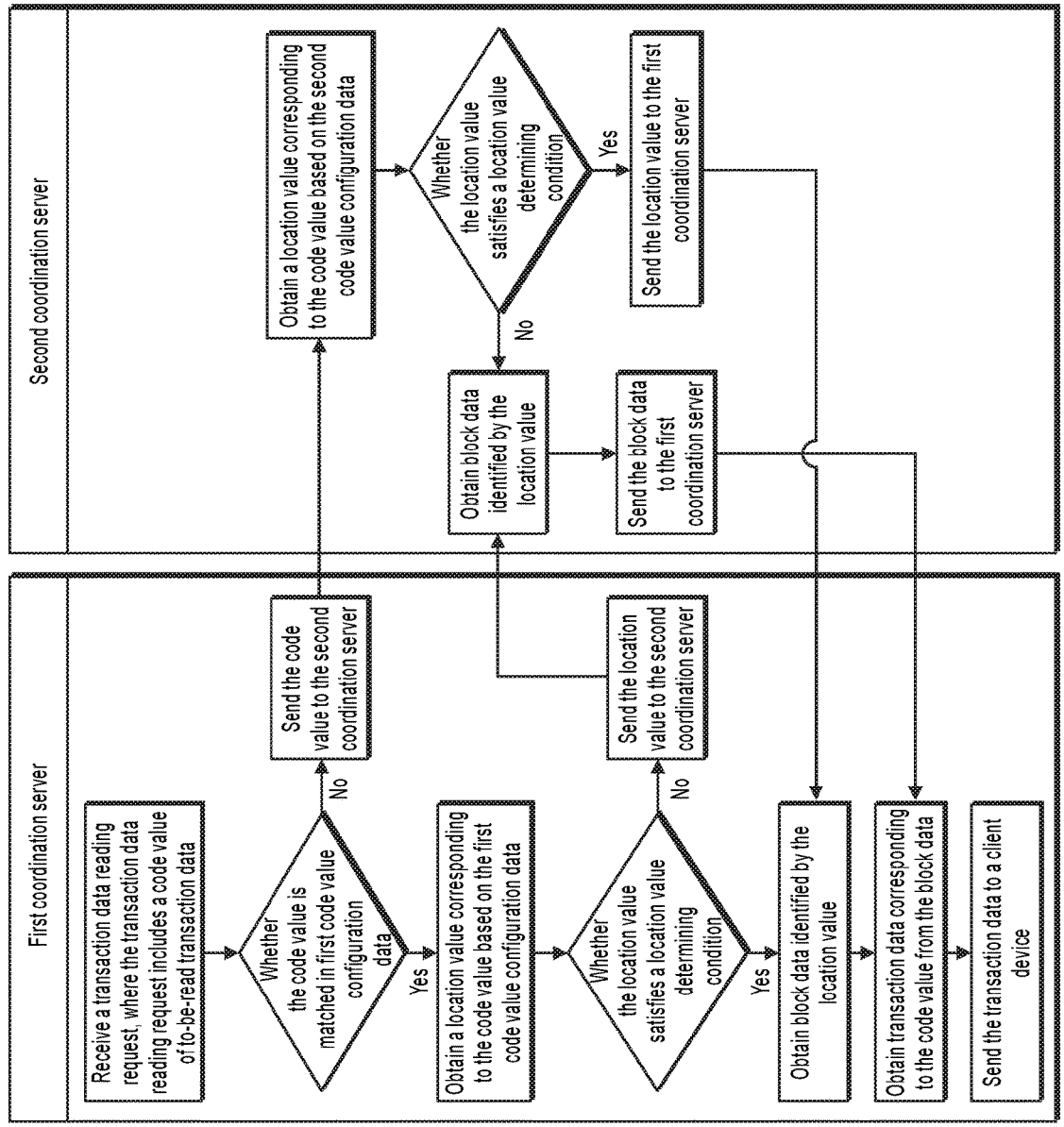
FIG. 7 is a flowchart illustrating a transaction data reading method according to an implementation of the present specification.

Referring to FIG. 7, in some implementations, the to-be-processed data can be to-be-read transaction data. The client device can select a first coordination server as a target coordination server, and send a transaction data reading request to the first coordination server. The transaction data reading request can include a code value of the to-be-read transaction data. The first coordination server can receive the transaction data reading request and perform matching on the code value in first code value configuration data.

When the code value is matched in the first code value configuration data, the first coordination server can obtain a location value corresponding to the code value based on the first code value configuration data; and can determine whether the location value satisfies a location value determining condition. When the location value satisfies the location value determining condition, the first coordination server considers that block data identified by the location value is stored in the server cluster that the first coordination server is located; obtain the block data identified by the location value; obtain transaction data corresponding to the code value from the block data; and send the transaction data to the client device. The client device can receive the transaction data. When the location value does not satisfy the location value determining condition, the first coordination server considers that the block data identified by the location value is stored in a second server cluster, and can send the location value to the second coordination server. The second coordination server can receive the location value, obtain the block data identified by the location value, and send the block data to the first coordination server. The first coordination server can receive the block data, obtain the transaction data corresponding to the code value from the block data, and send the transaction data to the client device. The client device can receive the transaction data.

When the code value is not matched in the first code value configuration data, the first coordination server considers that the code value can be matched in second code value configuration data; and can send the code value to the second coordination server. The second coordination server can receive the code value, obtain the location value corresponding to the code value based on the second code value configuration data, and determine whether the location value satisfies the location value determining condition. When the location value does not satisfy the location value determining condition, the second coordination server considers that block data identified by the location value is stored in the server cluster that the second coordination server is located; obtain the block data identified by the location value; and send the block data to the first coordination server. The first coordination server can receive the block data, obtain the transaction data corresponding to the code value from the block data, and send the transaction data to the client device. The client device can receive the transaction data. When the location value satisfies the location value determining condition, the second coordination server considers that the block data identified by the location value is stored in a first server cluster, and can send the location value to the first coordination server. The first coordination server can receive the location value, obtain block data identified by the location value, obtain transaction data corresponding to the code value from the block data, and send the transaction data to the client device. The client device can receive the transaction data.

In addition, as described above, when the code value in the first code value configuration data and the second code value configuration data is the code value of the transaction data, each code value in the first code value configuration data and the second code value configuration data can further correspond to an offset. As such, the first coordination server can obtain a location value and an offset corresponding to the code value based on the first code value configuration data, and further obtain, based on the offset, the transaction data corresponding to the code value from the block data. Or the second coordination server can obtain a location value and an offset corresponding to the code value based on the second code value configuration data, and send the offset to the first coordination server. Further, the first coordination server can obtain, based on the offset, the transaction data corresponding to the code value from the block data.

Figure 8:
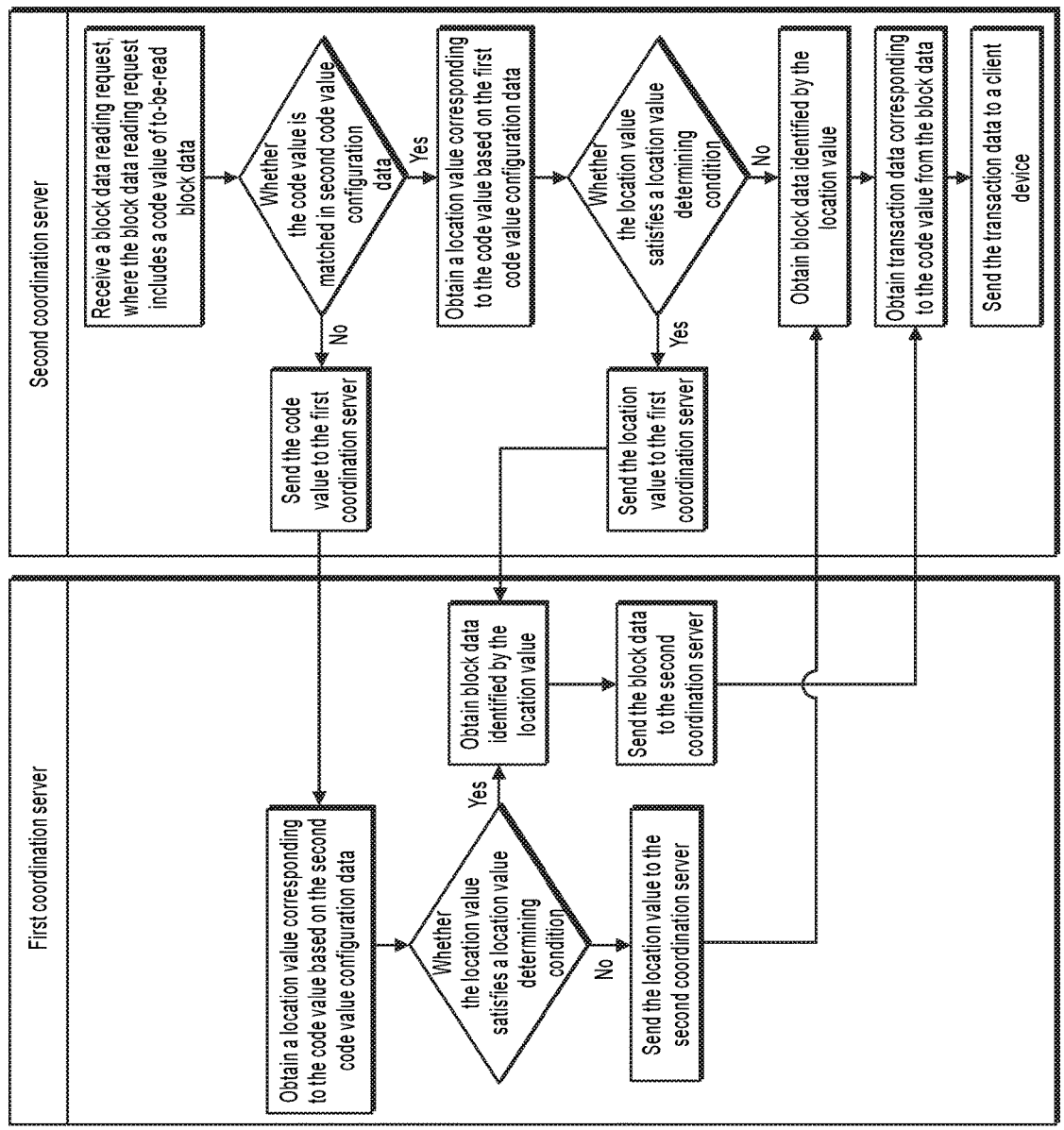
FIG. 8 is a flowchart illustrating a transaction data reading method according to an implementation of the present specification.

Referring to FIG. 8, in another example method of this implementation, the to-be-processed data can be to-be-read transaction data. The client device can select a second coordination server as a target coordination server, and send a transaction data reading request to the second coordination server. The transaction data reading request can include a code value of the to-be-read transaction data. The second coordination server can receive the transaction data reading request and perform matching on the code value in second code value configuration data.

When the code value is matched in the second code value configuration data, the second coordination server can obtain a location value corresponding to the code value based on the second code value configuration data; and can determine whether the location value satisfies a location value determining condition. When the location value satisfies the location value determining condition, the second coordination server considers that the block data identified by the location value is stored in a first server cluster, and can send the location value to the first coordination server. The first coordination server can receive the location value, obtain the block data identified by the location value, and send the block data to the second coordination server. The second coordination server can receive the block data, obtain the transaction data corresponding to the code value from the block data, and send the transaction data to the client device. The client device can receive the transaction data. When the location value does not satisfy the location value determining condition, the second coordination server considers that block data identified by the location value is stored in the server cluster that the second coordination server is located; obtain the block data identified by the location value; obtain transaction data corresponding to the code value from the block data; and send the transaction data to the client device. The client device can receive the transaction data.

When the code value is not matched in the second code value configuration data, the second coordination server considers that the code value can be matched in first code value configuration data; and can send the code value to the first coordination server. The first coordination server can receive the code value, obtain the location value corresponding to the code value based on the first code value configuration data, and determine whether the location value satisfies the location value determining condition. When the location value satisfies the location value determining condition, the first coordination server considers that block data identified by the location value is stored in the server cluster that the first coordination server is located; obtain the block data identified by the location value; and send the block data to the second coordination server. The second coordination server can receive the block data, obtain the transaction data corresponding to the code value from the block data, and send the transaction data to the client device. The client device can receive the transaction data. When the location value does not satisfy the location value determining condition, the first coordination server considers that the block data identified by the location value is stored in a second server cluster, and can send the location value to the second coordination server. The second coordination server can receive the location value, obtain block data identified by the location value, obtain transaction data corresponding to the code value from the block data, and send the transaction data to the client device. The client device can receive the transaction data.

In this implementation, the client device can select a target coordination server from multiple coordination servers based on performance information of server clusters, and send a data processing request to the target coordination server, so a server cluster that the target coordination server belongs to can prioritize handling of the data processing request. As such, the client device can send the data processing request to different coordination servers based on different performance information of the server clusters, thereby achieving load balancing of multiple server clusters and accelerating data processing.

Figure 9:
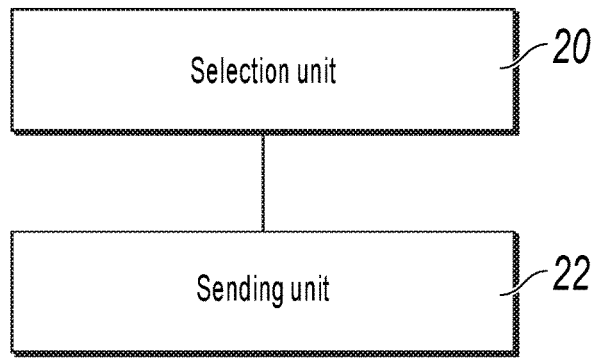
FIG. 9 is a schematic structural diagram illustrating a data processing apparatus, according to an implementation of the present specification.

Referring to FIG. 9, an implementation of the present specification further provides a data processing apparatus, applied to a client device. The data processing apparatus can include the following units: a selection unit 2C), configured to select a target coordination server from multiple coordination servers based on performance information of server clusters, where the multiple coordination servers respectively belong to multiple server clusters; and a sending unit 22, configured to send a data processing request to the target coordination server, so a server cluster that the target coordination server belongs to can prioritize handling of the data processing request.

Figure 10:
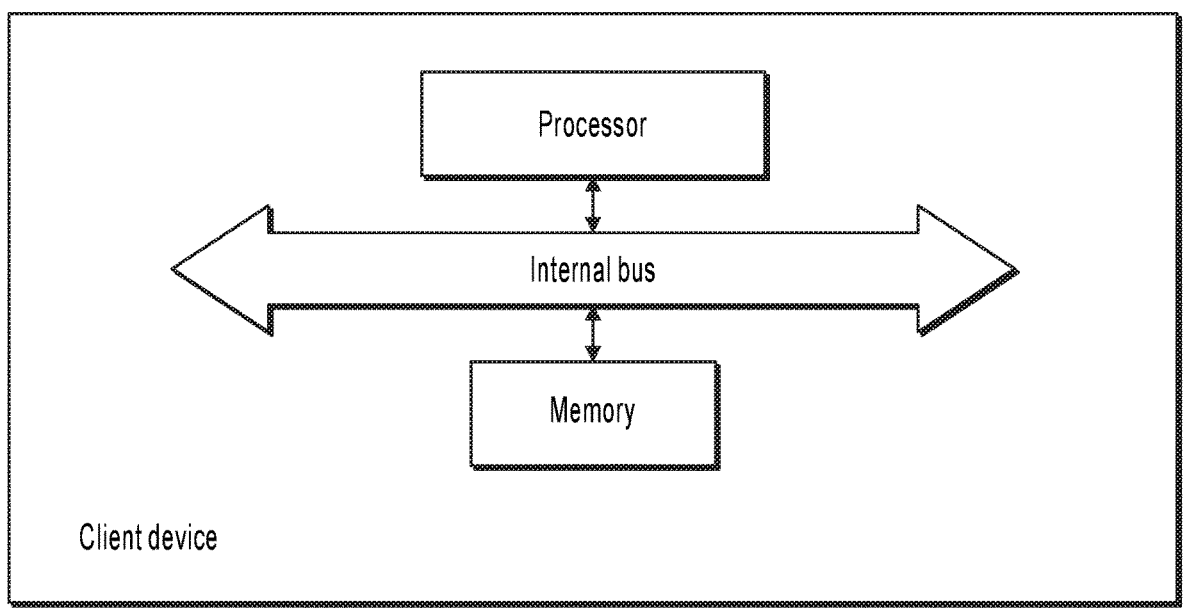
FIG. 10 is a schematic structural diagram illustrating a client device according to an implementation of the present specification.

Referring to FIG. 10, an implementation of the present specification further provides a client device. The client device can include a memory and a processor.

In this implementation, the memory includes but is not limited to a dynamic random access memory (DRAM), a static random access memory (SRAM), etc. The memory can be configured to store computer instructions.

In this implementation, the processor can be implemented in any suitable method. For example, the processor can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. The processor can be configured to execute the computer instructions to implement the following steps: selecting a target coordination server from multiple coordination servers based on performance information of server clusters, where the multiple coordination servers respectively belong to multiple server clusters and sending a data processing request to the target coordination server, so a server cluster that the target coordination server belongs to can prioritize handling of the data processing request.

The implementations in the present specification are described in a progressive way. For same or similar parts of the implementations, references can be made to the implementations. Each implementation focuses on a difference from other implementations. In particular, because the data processing apparatus implementation and the client device implementation are basically similar to the data processing method implementation, the description is relatively simple. For related parts, refer to the description in the data processing method implementation.

In addition, it can be understood that, after reading the present specification, a person skilled in the art can think of combinations between some or all of the implementations enumerated in the present specification without creative efforts. These combinations are also within the scope disclosed and protected by the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip 2. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

It can be understood from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in the implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumption electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method, comprising:
   requesting, by a client device, performance information of each server cluster of a plurality of server clusters of a blockchain node, wherein each server cluster of the plurality of server clusters of the blockchain node includes a coordination server and multiple task servers, wherein the multiple task servers are managed by the coordination server, wherein each server cluster of the plurality of server clusters of the blockchain node separately stores at least one piece of block data in the blockchain node, and wherein each piece of block data in the blockchain node has a location value;
   selecting, by the client device, a target coordination server from plurality of coordination servers based on the performance information of each server cluster of the plurality of server clusters of the blockchain node, wherein the plurality of coordination servers belong to the plurality of server clusters of the blockchain node, respectively; and
   sending, by the client device, a data processing request to the target coordination server corresponding to a target server cluster of the plurality of server clusters of the blockchain node, wherein the target server cluster includes the target coordination server, and wherein the target coordination server is responsible for task allocation and block data management associated with a multiple target task servers, and coordinating joint processes corresponding to block data management with another coordination server belonging to another server cluster of the plurality of server clusters of the blockchain node based on a location value determining condition of block data.

2. The computer-implemented method of claim 1, wherein performance information of the target server cluster indicates a data processing capability of the target server cluster.

3. The computer-implemented method of claim 2, wherein the performance information comprises at least one of a quantity of block data stored in the target server cluster, a ratio between the quantity of block data stored in the target server cluster and an quantity of block data in a blockchain, a throughput of the target server cluster, a concurrency of the target server cluster, a response time of the target server cluster, or a hardware configuration of the target server cluster.

4. The computer-implemented method of claim 3, wherein at least one server cluster is corresponding to a blockchain node, wherein each of the at least one server cluster comprises at least one server, wherein the blockchain includes a plurality of blockchain nodes, and wherein each blockchain node stores all or part of block data in the blockchain.

5. The computer-implemented method of claim 1, wherein the plurality of coordination servers comprise a first coordination server and a second coordination server, and wherein the first coordination server belongs to a first server cluster and the second coordination server belongs to a second server cluster.

6. The computer-implemented method of claim 5, wherein selecting the target coordination server from the plurality of coordination servers comprises:
   comparing a first data processing capability of the first server cluster with a second data processing capability of the second server cluster based on a first performance information of the first server cluster and a second performance information of the second server cluster; and
   determining the selection of the target coordination server, comprising:
     selecting the first coordination server as the target coordination server when the first data processing capability of the first server cluster is greater than that of the second server cluster; or
     selecting the second coordination server as the target coordination server when the first data processing capability of the first server cluster is less than that of the second server cluster.

7. The computer-implemented method of claim 1, wherein the data processing request comprises:
   a block data reading request, and the block data reading request comprises a member identifier or a code value of to-be-read block data;
   a status data reading request, and the status data reading request comprises the member identifier;
   a status data writing request, comprising the member identifier and to-be-written status data; or
   a transaction data reading request, and the transaction data reading request comprises a code value of to-be-read transaction data.

8. The computer-implemented method of claim 1, wherein sending the data processing request to different server clusters is based on different performance information of the plurality of server clusters of the blockchain node for achieving load balancing of the plurality of server clusters of the blockchain node.

9. A non-transitory, computer-readable medium storing one or more instructions executable by a computer system to perform operations, comprising:
requesting performance information of each server cluster of a plurality of server clusters of the blockchain node, wherein each server cluster of the plurality of server clusters of the blockchain node includes a coordination server and multiple task servers, wherein the multiple task servers are managed by the coordination server, wherein each server cluster of the plurality of server clusters of the blockchain node separately store at least one piece of block data in the blockchain node, and wherein each piece of block data in the blockchain node has a location value;
selecting a target coordination server from plurality of coordination servers based on the performance information of each server cluster of the plurality of server clusters of the blockchain node, wherein the plurality of coordination servers belong to the plurality of server clusters of the blockchain node, respectively; and
sending a data processing request to the target coordination server corresponding to a target server cluster of the plurality of server clusters of the blockchain node, wherein the target server cluster includes the target coordination server, and wherein the target coordination server is responsible for task allocation and block data management associated with a multiple target task servers, and coordinating joint processes corresponding to block data management with another coordination server belonging to another server cluster of the plurality of server clusters of the blockchain node based on a location value determining condition of block data.

10. The non-transitory, computer-readable medium of claim 9, wherein performance information of the target server cluster indicates a data processing capability of the target server cluster.

11. The non-transitory, computer-readable medium of claim 10, wherein the performance information comprises at least one of a quantity of block data stored in the target server cluster, a ratio between the quantity of block data stored in the target server cluster and an quantity of block data in a blockchain, a throughput of the target server cluster, a concurrency of the target server cluster, a response time of the target server cluster, or a hardware configuration of the target server cluster.

12. The non-transitory, computer-readable medium of claim 11, wherein at least one server cluster is corresponding to a blockchain node, wherein each of the at least one server cluster comprises at least one server, wherein the blockchain includes a plurality of blockchain nodes, and wherein each blockchain node stores all or part of block data in the blockchain.

13. The non-transitory, computer-readable medium of claim 9, wherein the plurality of coordination servers comprise a first coordination server and a second coordination server, and wherein the first coordination server belongs to a first server cluster and the second coordination server belongs to a second server cluster.

14. The non-transitory, computer-readable medium of claim 13, wherein selecting the target coordination server from the plurality of coordination servers comprises:
comparing a first data processing capability of the first server cluster with a second data processing capability of the second server cluster based on a first performance information of the first server cluster and a second performance information of the second server cluster; and
determining the selection of the target coordination server, comprising:
selecting the first coordination server as the target coordination server when the first data processing capability of the first server cluster is greater than that of the second server cluster; or
selecting the second coordination server as the target coordination server when the first data processing capability of the first server cluster is less than that of the second server cluster.

15. The non-transitory, computer-readable medium of claim 9, wherein the data processing request comprises:
a block data reading request, and the block data reading request comprises a member identifier or a code value of to-be-read block data;
a status data reading request, and the status data reading request comprises the member identifier;
a status data writing request, comprising the member identifier and to-be-written status data; or
a transaction data reading request, and the transaction data reading request comprises a code value of to-be-read transaction data.

16. The non-transitory, computer-readable medium of claim 9, wherein sending the data processing request to different server clusters is based on different performance information of the plurality of server clusters of the blockchain node for achieving load balancing of the plurality of server clusters of the blockchain node.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
requesting performance information of each server cluster of a plurality of server clusters of a blockchain node, wherein each server cluster of the plurality of server clusters of the blockchain node includes a coordination server and multiple task servers, wherein the multiple task servers are managed by the coordination server, wherein each server cluster of the plurality of server clusters of the blockchain node separately store at least one piece of block data in the blockchain node, and wherein each piece of block data in the blockchain node has a location value;
selecting a target coordination server from plurality of coordination servers based on the performance information of each server cluster of the plurality of server clusters of the blockchain node, wherein the plurality of coordination servers belong to the plurality of server clusters of the blockchain node, respectively; and
sending a data processing request to the target coordination server corresponding to a target server cluster of the plurality of server clusters of the blockchain node, wherein the target server cluster includes the target coordination server, and wherein the target coordination server is responsible for task allocation and block data management block data management associated with a multiple target task servers, and coordinating joint processes corresponding to block data management with another coordination server belonging to another server cluster of the plurality of server clusters of the blockchain node based on a location value determining condition of block data.

18. The computer-implemented system of claim 17, wherein performance information of the target server cluster indicates a data processing capability of the target server cluster.

19. The computer-implemented system of claim 18, wherein the performance information comprises at least one of a quantity of block data stored in the target server cluster, a ratio between the quantity of block data stored in the target server cluster and an quantity of block data in a blockchain, a throughput of the target server cluster, a concurrency of the target server cluster, a response time of the target server cluster, or a hardware configuration of the target server cluster.

20. The computer-implemented system of claim 19, wherein at least one server cluster is corresponding to a blockchain node, wherein each of the at least one server cluster comprises at least one server, wherein the blockchain includes a plurality of blockchain nodes, and wherein each blockchain node stores all or part of block data in the blockchain.

21. The computer-implemented system of claim 17, wherein the plurality of coordination servers comprise a first coordination server and a second coordination server, and wherein the first coordination server belongs to a first server cluster and the second coordination server belongs to a second server cluster.

22. The computer-implemented system of claim 21, wherein selecting the target coordination server from the plurality of coordination servers comprises:
comparing a first data processing capability of the first server cluster with a second data processing capability of the second server cluster based on a first performance information of the first server cluster and a second performance information of the second server cluster; and
determining the selection of the target coordination server, comprising:
selecting the first coordination server as the target coordination server when the first data processing capability of the first server cluster is greater than that of the second server cluster; or
selecting the second coordination server as the target coordination server when the first data processing capability of the first server cluster is less than that of the second server cluster.

23. The computer-implemented system of claim 17, wherein the data processing request comprises:
a block data reading request, and the block data reading request comprises a member identifier or a code value of to-be-read block data;
a status data reading request, and the status data reading request comprises the member identifier;
a status data writing request, comprising the member identifier and to-be-written status data; or
a transaction data reading request, and the transaction data reading request comprises a code value of to-be-read transaction data.

24. The computer-implemented system of claim 17, wherein sending the data processing request to different server clusters is based on different performance information of the plurality of server clusters of the blockchain node for achieving load balancing of the plurality of server clusters of the blockchain node.

* * * * *

UNITED STATES PATENT AND TRADEMARK OFFICE
CERTIFICATE OF CORRECTION

| | |
|---|---|
| PATENT NO. | : 11,233,878 B2 |
| APPLICATION NO. | : 17/086155 |
| DATED | : January 25, 2022 |
| INVENTOR(S) | : Xinying Yang |

It is certified that error appears in the above-identified patent and that said Letters Patent is hereby corrected as shown below:

In the Claims

Column 20, Line 63, Claim 17, delete "block data management block data management" and insert -- block data management --.

Signed and Sealed this
Thirty-first Day of May, 2022

Katherine Kelly Vidal
*Director of the United States Patent and Trademark Office*